US008818078B2

(12) United States Patent
Telfer et al.

(10) Patent No.: US 8,818,078 B2
(45) Date of Patent: Aug. 26, 2014

(54) APPARATUS AND METHOD FOR OPTICALLY MEASURING CREEP

(75) Inventors: Michael J. Telfer, San Diego, CA (US);
Michael A. Coe, El Cajon, CA (US);
Brent A. Cottom, San Diego, CA (US);
Jeffrey R. Price, San Diego, CA (US)

(73) Assignee: Solar Turbines Inc., San Diego, CA (US)

( * ) Notice: Subject to any disclaimer, the term of this patent is extended or adjusted under 35 U.S.C. 154(b) by 160 days.

(21) Appl. No.: 13/365,488

(22) Filed: Feb. 3, 2012

(65) Prior Publication Data

US 2013/0202192 A1   Aug. 8, 2013

(51) Int. Cl.
*G06K 9/00*   (2006.01)

(52) U.S. Cl.
USPC ............ 382/154; 382/149; 382/151; 382/152

(58) Field of Classification Search
None
See application file for complete search history.

(56) References Cited

U.S. PATENT DOCUMENTS

| 5,034,284 | A | * | 7/1991 | Bornstein et al. | 428/680 |
| 5,558,922 | A | * | 9/1996 | Gupta et al. | 428/141 |
| 6,316,078 | B1 | * | 11/2001 | Smialek | 428/141 |
| 6,572,981 | B2 | | 6/2003 | Spitsberg | |
| 7,360,437 | B2 | | 4/2008 | Hardwicke et al. | |
| 7,387,030 | B1 | * | 6/2008 | deLaneuville | 73/808 |
| 7,493,809 | B1 | * | 2/2009 | Ward, Jr. | 73/168 |
| 7,689,003 | B2 | | 3/2010 | Shannon et al. | |
| 7,810,385 | B1 | * | 10/2010 | Narcus | 73/112.01 |
| 7,925,454 | B1 | * | 4/2011 | Narcus | 702/34 |
| 8,244,025 | B2 | * | 8/2012 | Davis et al. | 382/154 |
| 8,505,181 | B1 | * | 8/2013 | Brostmeyer et al. | 29/407.05 |
| 2002/0146162 | A1 | * | 10/2002 | Ozaki et al. | 382/152 |
| 2004/0139809 | A1 | | 7/2004 | Soechting et al. | |
| 2005/0063450 | A1 | * | 3/2005 | Willsch et al. | 374/57 |
| 2007/0209447 | A1 | | 9/2007 | Christ, Jr. et al. | |
| 2009/0178417 | A1 | | 7/2009 | Draper et al. | |
| 2009/0252987 | A1 | * | 10/2009 | Greene, Jr. | 428/678 |
| 2010/0053596 | A1 | | 3/2010 | Boswell | |
| 2010/0242580 | A1 | * | 9/2010 | Nelson et al. | 73/86 |
| 2011/0106459 | A1 | * | 5/2011 | Christ et al. | 702/42 |
| 2012/0293647 | A1 | * | 11/2012 | Singh et al. | 348/82 |

FOREIGN PATENT DOCUMENTS

| EP | 1491657 A1 | * | 12/2004 |
| JP | 3248034 | | 11/1991 |
| JP | 10123123 | | 5/1998 |
| WO | WO 2009105221 A2 | * | 8/2009 |

OTHER PUBLICATIONS

Wikipedia entry for Thermo-mechanical fatigue, retrieved Dec. 8, 2010.*

(Continued)

*Primary Examiner* — Stephen R Koziol
*Assistant Examiner* — Jonathan S Lee
(74) *Attorney, Agent, or Firm* — Finnegan, Henderson, Farabow, Garrett & Dunner LLP

(57) ABSTRACT

A method of measuring creep strain in a gas turbine engine component, where at least a portion of the component has a material disposed thereon, and where the material has a plurality of markings providing a visually distinct pattern. The method may include capturing an image of at least a portion of the markings after an operational period of the gas turbine engine, and determining creep strain information of the component. The creep strain information may be determined by correlating the image captured after the operational period to an image captured before the operational period.

20 Claims, 4 Drawing Sheets

(56) References Cited

OTHER PUBLICATIONS

Strangman, T.E., Thermal-Mechanical Fatigue Life Model for Coated Superalloy Turbine Components, 1992, Superalloys, pp. 795-804.*

Withey, E., Petorak, C., Trice, R., Dickinson, G., and Taylor, T., "Design of 7 wt.% Y2O3—ZrO2/Mullite Plasma-Sprayed Composite Coatings for Increased Creep Resistance," Journal of the American Ceramic Society, 28 pages, West Lafayette, Indiana and Indianapolis, Indiana, available online Apr. 18, 2007.

* cited by examiner

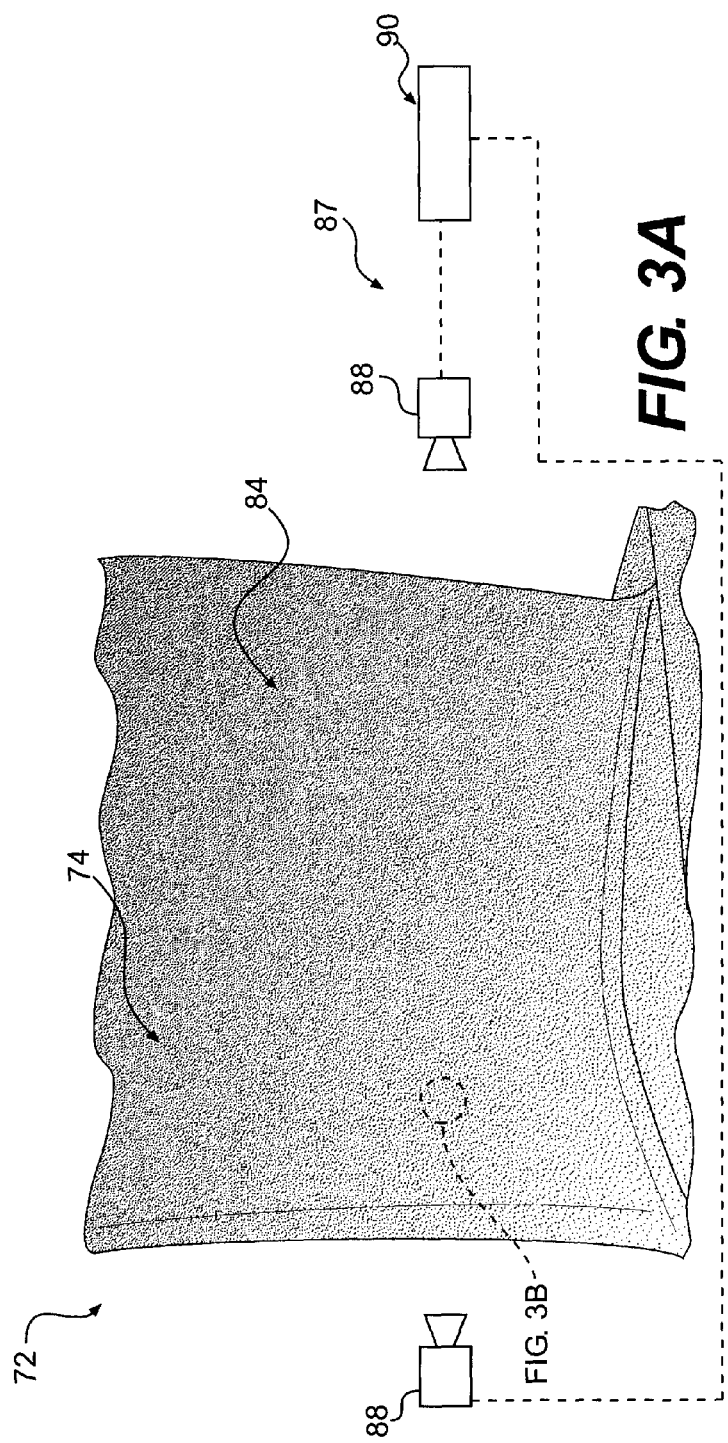
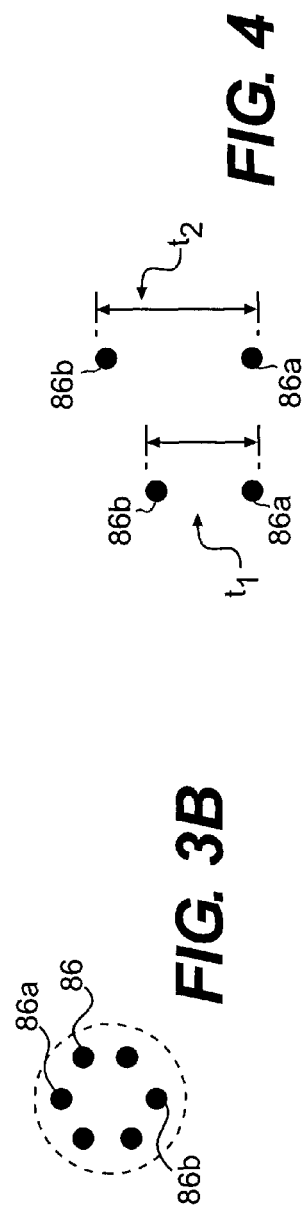
FIG. 3A
FIG. 3B
FIG. 4

APPARATUS AND METHOD FOR OPTICALLY MEASURING CREEP

TECHNICAL FIELD

The present disclosure is directed to a system and method for optically measuring creep and, more particularly, to a system and method for optically measuring creep in components by applying a material to a component surface, and imaging the material to determine creep over a period of time.

BACKGROUND

Gas turbine engines (GTE) produce power by extracting energy from a flow of hot gas produced by combustion of fuel in a stream of compressed air. In general, turbine engines have an upstream air compressor coupled to a downstream turbine with a combustion chamber ("combustor") in between. Energy is released when a mixture of compressed air and fuel is burned in the combustor. In a typical turbine engine, one or more fuel injectors direct a liquid or gaseous hydrocarbon fuel into the combustor for combustion. The resulting hot gases are directed over blades of the turbine to spin the turbine and produce mechanical power.

Turbine blades and other components of GTEs are subject to creep due to high temperatures and stresses during operation. Components which undergo creep are permanently deformed and can be subject to mechanical failure. Component failure from creep can result from either component breakage due to a reduced cross section of the component as a result of creep deformation, or creep rupture where the rupture creates cracks which may propagate until the component is broken. For turbine blades, creep may cause the entire blade to elongate so that the blade tips contact a stationary structure, for example a turbine casing, and cause unwanted vibrations, blade damage, or loss of performance during operation.

Japanese Patent Application Publication JP10123123A to Konno et al. (the '123 publication) describes a method for estimating creep life of a gas turbine part made from an alloy subject to high temperatures and stresses. According to the '123 publication, in order to estimate the creep life of a gas turbine part, a test operation is carried out, during which an alloy round bar specimen is subjected to various temperatures and stresses. The round bar specimen used during the test is presumed to correspond to a gas turbine part subject to high temperatures and stresses. The test is interrupted at various times, during which an average diameter of a particle of the alloy is measured. Based on at least a change in the average diameter of the particle over a period of time, the creep life of a gas turbine part can be estimated.

SUMMARY

In one aspect, a method of measuring creep strain in a gas turbine engine component is disclosed. At least a portion of the component has a material disposed thereon, where the material provides a plurality of markings arranged in a visually distinct pattern. The method may include capturing an image of at least a portion of the markings after an operational period of the gas turbine engine, and determining creep strain information of the component. The creep strain information may be determined by correlating the image captured after the operational period to an image captured before the operational period.

In another aspect, a method of measuring creep strain in a gas turbine engine component is disclosed. The method may include applying a material in a visually distinct pattern of markings to at least a portion of the component. The method may further include capturing a first image using a 3D image correlation photogrammetry system, placing the component into operation for an operational period of time, then capturing a second image using a 3D image correlation photogrammetry system after the operational period of time has lapsed. The method may also include correlating the first image to the second image through a 3D image correlation photogrammetry system to determine actual creep strain information of the component.

In yet another aspect, a system for measuring creep strain in a component of a gas turbine engine is disclosed. The system may include a gas turbine engine component, and a material disposed on at least a portion of the gas turbine engine component. In some embodiments, the material may provide a visually distinct pattern of markings. The system may further include a 3D image correlation photogrammetry system configured to acquire and compare images of the markings in order to determine creep strain information after an operational period of the gas turbine engine.

BRIEF DESCRIPTION OF THE DRAWINGS

FIG. 3A is a perspective view of an inner fillet radius and airfoil portion of the turbine blade of FIG. 2 showing a material applied to the turbine blade;

FIG. 3B is a perspective view of a magnified portion of FIG. 3A showing a plurality of markings of the applied material;

FIG. 4 is a view of two of the markings of FIG. 3B showing creep by displacement between the two markings before and after the GTE has run for an operational period of time.

DETAILED DESCRIPTION

Figure 1:
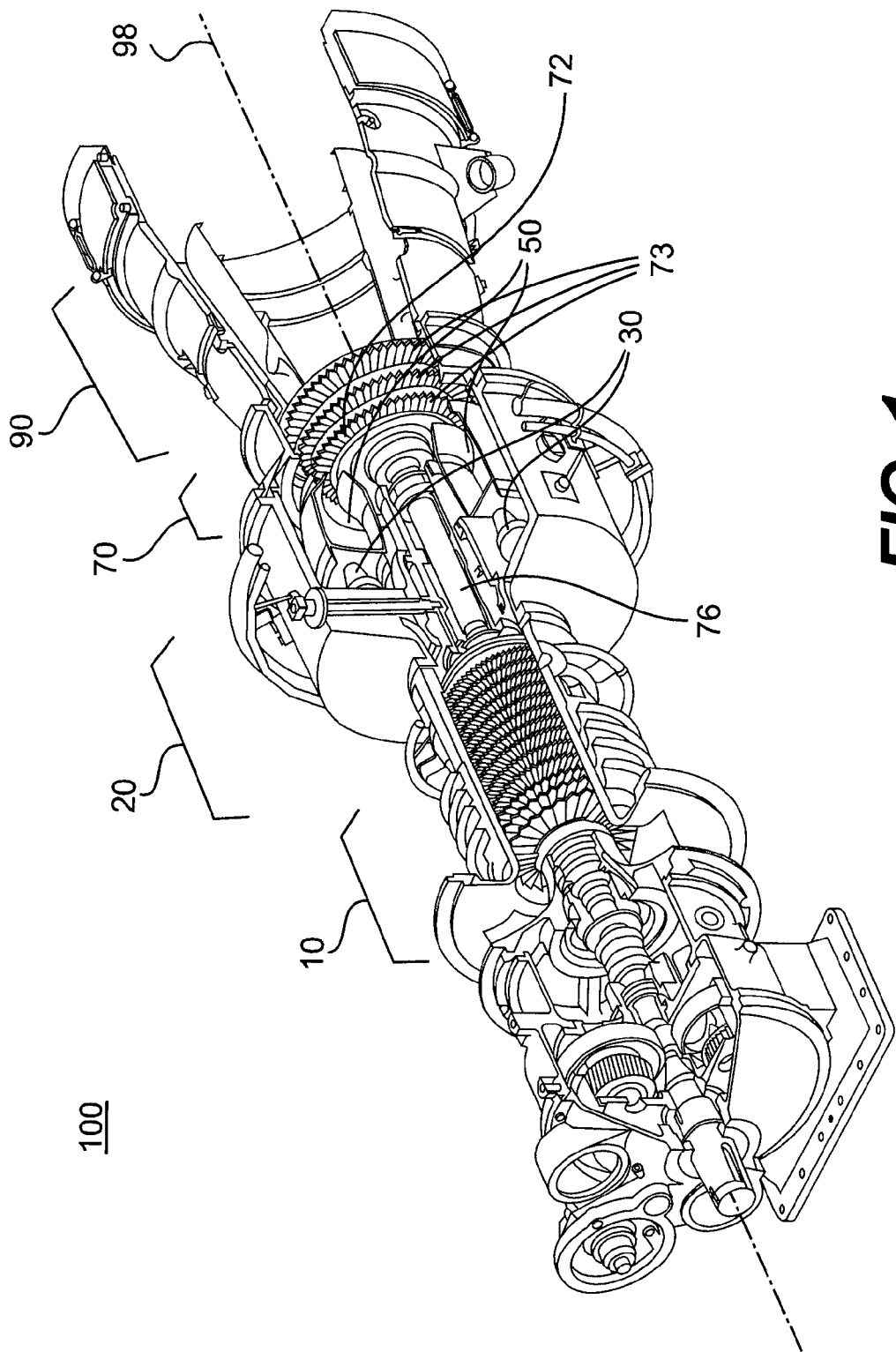
FIG. 1 is an illustration of an exemplary disclosed GTE.

FIG. 1 illustrates an exemplary gas turbine engine (GTE) 100. GTE 100 may have, among other systems, a compressor system 10, a combustor system 20, a turbine system 70, and an exhaust system 90 arranged along an engine axis 98. Compressor system 10 compresses air and delivers the compressed air to an enclosure of combustor system 20. The compressed air is then directed from enclosure into a combustor 50 through one or more fuel injectors 30 (hereinafter referred to as fuel injector 30) positioned therein. One or more types of fuel (such as, for example, a gaseous fuel and a liquid fuel) may also be directed to the fuel injector 30 through fuel lines (not identified). This fuel may be directed into the combustor 50 through the fuel injectors 30. The fuel burns in combustor 50 to produce combustion gases at high pressure and temperature. These combustion gases are used in the turbine system 70 to produce mechanical power. The turbine system 70 may further include a plurality of turbine blades 72 as part of a series of turbine rotors 73, and a plurality of turbine nozzles as part of a series of turbine stators (not shown). Turbine system 70 extracts energy from the combustion gases and directs the exhaust gases to the atmosphere through exhaust system 90.

Figure 2:
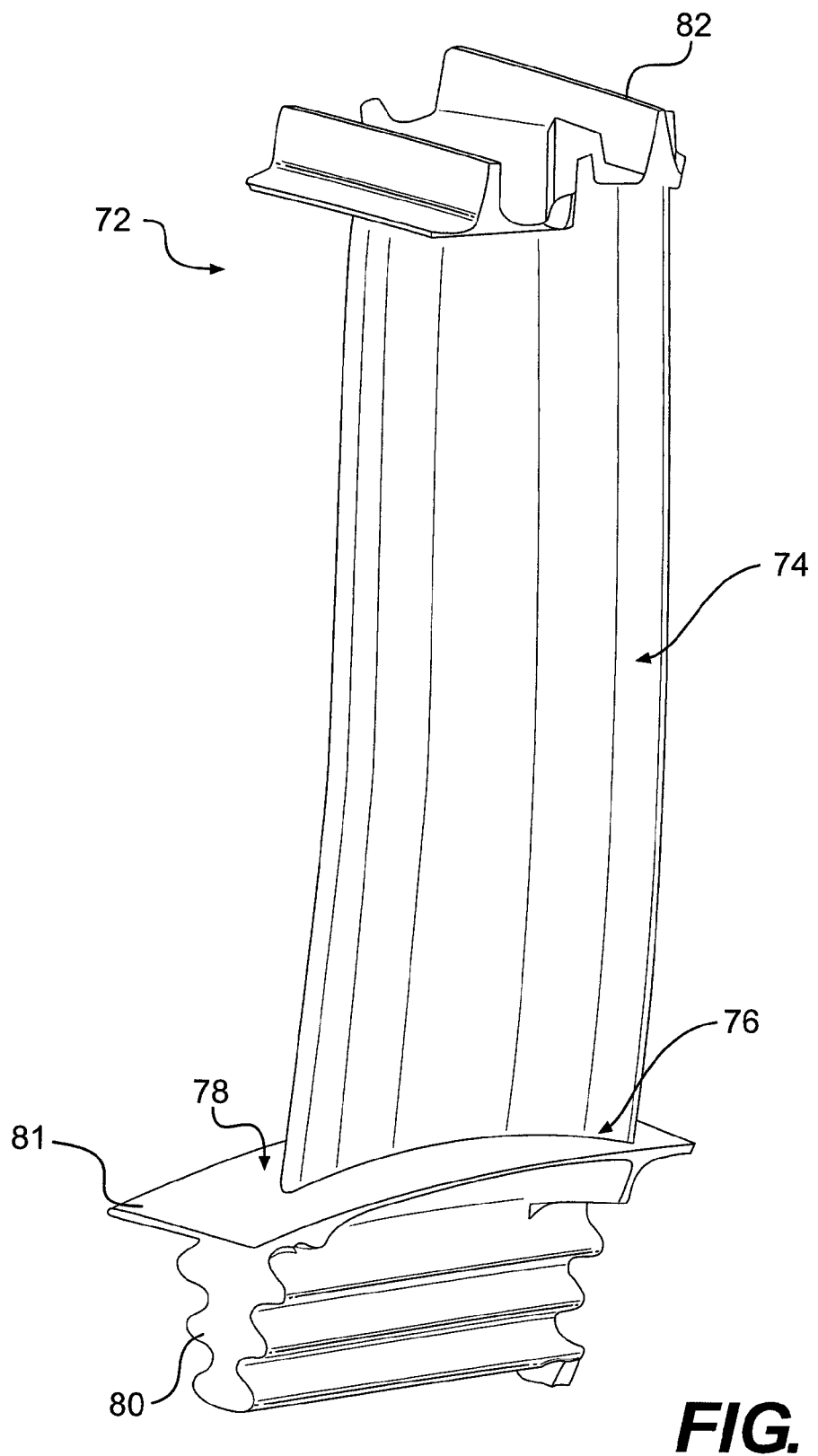
FIG. 2 is a perspective view of an exemplary turbine blade of the GTE.

FIG. 2 is a perspective view of an exemplary turbine blade 72 as a GTE component of the turbine rotor 73 of the GTE 100. The turbine blade 72 includes at least a airfoil portion 74, an inner filet radius part 76, and an outer fillet radius part 78.

The turbine blade 72 may further include a root 80 connected to a platform 81, as well as shrouding 82. The turbine blade 72 may be made from any suitable material known in the art such as, for example, nickel-steel or ceramic material. The turbine system 70 extracts energy from the combustion gases acting against the airfoils 74 of the turbine blades 72 to rotate the turbine rotors 73 that are connected to a drive shaft 76, as shown in FIG. 1. Although the turbine blade 72 of FIG. 2 includes a fir-tree shaped root 80, a turbine blade of the present disclosure could utilize any root configuration known in the art. Furthermore, although the turbine blade 72 of FIG. 2 includes shrouding 82, the present disclosure is not limited to a shrouded turbine blade, as a non-shrouded turbine blade could be used.

FIG. 3A is a perspective view of an inner fillet radius 76 and airfoil portion 74 of the turbine blade 72 of FIG. 2 showing a material 84 applied to the surface of the turbine blade 72. The material 84 forms a visually distinct pattern of a plurality of markings 86 on the surface of the turbine blade 72. As described herein, a "visually distinct pattern" may refer to a pattern that is visually distinct to a human eye, or a pattern that a camera may be capable of distinguishing. For example, a "visually distinct pattern" may refer to a coating or other surface treatment which reflects infrared or ultraviolet light rather than or in addition to visible light. In the case of a visually distinct pattern that reflects light having a wavelength outside of the visible spectrum, filters, special illumination, and/or cameras may be used to recognize the pattern. A visually distinct pattern of the plurality of markings 86 may be, for example, a random pattern of constant and/or varying-sized dots as shown in FIG. 3A. In some embodiments, the visually distinct pattern of markings 86 may include markings 86 which are speckled, splattered, or otherwise provided on the surface of the turbine blade 72. The markings 86 may also be sized according to an amount of detail desired from a creep measurement. For example, where markings 86 are provided as dots, smaller dots may be provided for finer detail, whereas larger dots may be provided for other detail related to creep deformation. Thus, the markings 86 may be provided to the turbine blade 72 in a variety ways to form visually distinct patterns.

The material 84 may be applied to an entire surface of the turbine blade 72, the entire surface of a part of the turbine blade 72, or only a portion of a part of the turbine blade 72 (i.e. all of the surface of the airfoil portion 74, or only a portion of the airfoil part 74). The material 84 may be applied anywhere where it may be desirable to measure creep, such as but not limited to the root 80, the airfoil portion 74, the platform 81, or the shrouding 82. Alternatively or additionally, the markings 86 can be applied to any other GTE component or part or portion thereof where creep is desired to be measured.

In one exemplary embodiment, the material 84 is a ceramic, which is capable of surviving the operating conditions of a GTE component over a period of time, for example thousands to hundreds of thousands of hours, so that measurable creep strains are generated. In one exemplary embodiment, yttria-stabilized zirconia (YSZ) ceramic is used as the material 84. As described in more detail below, YSZ may be applied to a portion of a GTE component, for example, to one or more of the inner fillet radius 76, the outer fillet radius 78, the pressure side of the airfoil portion 74, or the suction side of the airfoil portion 74, using a thermal spraying process such as plasma spraying. Spraying a ceramic such as YSZ onto a GTE component provides a thin layer of ceramic to the component. In addition to forming a strong bond to existing coatings or substrates of the turbine blade 72, YSZ may have a bright color, which would provide a discernable optical contrast to a darker base material of GTE components for studying images produced by a 3D image correlation photogrammetry system, described in more detail below. In order to provide such an optical contrast, the YSZ may be applied at a rate and in an amount so that a proportion of 50% bright color to 50% dark color results, the bright color being due to the YSZ and the dark color being due to the base material of the turbine blade 72 to which the YSZ is applied. Furthermore, YSZ retains its optical properties over time with only small variations, and can be applied at an adequate density and size in order to obtain creep measurements of a required resolution and magnitude.

In addition to providing a visually distinct pattern of markings 86 on a component such as the turbine blade 72, YSZ, or a similar material, may also provide a thermal barrier for the turbine blade 72 or other components of the GTE 100 subject to high temperatures. For example, YSZ could be applied to an entire surface of a portion of a GTE component (such as the airfoil portion 74) in order to take advantage of the thermal properties of YSZ, although, as described in more detail below, the entire surface may not be imaged for the purposes of creep measurement. Instead, only a segment of the YSZ-applied surface of the component would be imaged and used to measure creep strain, whereby the segment is smaller than the entire surface of the YSZ-applied portion of the GTE component. The present disclosure is not limited to the surface treatment process of disposing a material 84, such as YSZ, via thermal spraying on a surface of the component. A variety of other surface treatment processes known in the art, such as treatment with paints or inks, staining, physical vapor deposition, for example electron beam physical vapor deposition ("EB-PVD"), or chemical etching, could be applied to create a visually distinct pattern of markings 86 for photogrammetric comparison. As referred to herein, "a material disposed thereon" may refer to a material 84 sprayed or otherwise provided on a surface of a component by any other surface treatment process, such as treatment with paints or inks, staining, physical vapor deposition, for example EB-PVD, or chemical etching.

FIG. 3A further shows a schematic view of cameras 88 of a 3D image correlation photogrammetry system 87 known in the art. The 3D image correlation photogrammetry system 87 may be a conventional system, such as the system provided by Gesellschaft für Optische Messtechnik (GOM), distributed by Trilion Quality Systems. As described in more detail below, the cameras 88 may be used to capture 3D image correlation photogrammetry images of the component having material 84 disposed thereon before and after an operation or test period. The pair of cameras 88 may be 3D high-resolution digital CCD cameras capable of recording component deformation under various load conditions. The 3D image correlation photogrammetry system 87 is a full-field, non-contact strain measuring device offering non-contact measurement of 3D deformation and strain using 3D image correlation methods, such as digital image correlation. The deformation of a structure under different load conditions may be recorded by the cameras 88 and evaluated using digital image processing. The photogrammetry system 87 further includes a conventional controller 90 connected to each of the cameras 88. The controller 90 receives input from the cameras 88, such as the 3D image correlation photogrammetry images of the component, and processes the input in order to output results related to deformation and strain of the component. The results output from the controller 90 may be automatically computed by the controller 90, and may include 3D surface coordinates, 3D displacements and velocities, surface strain values, and strain rates. Such outputs from the controller may be provided to an end user in any conventional manner, such as a display device.

FIG. 3B is a magnified view of a segment of a portion, for example the airfoil portion 74, of the turbine blade 72 of FIG. 3A having a material 84 disposed thereon ("a treated portion"), and showing a representation of a plurality of markings 86 of the material 84 applied to the turbine blade 72. Particularly, FIG. 3B indicates two markings 86a and 86b of the plurality of markings 86 which may be imaged by the cameras 88 of the 3D image correlation photogrammetry system 87. FIG. 4 shows creep by a comparison between the two markings 86a and 86b of the material 84 at two different times, $t_1$ and $t_2$, $t_1$ being before the GTE 100 has run for a period of time (herein referred to as an operational period) and $t_2$ being some time after the operational period, as described in more detail below.

INDUSTRIAL APPLICABILITY

The disclosed system and method of measuring creep may be applicable to measure creep in any desired GTE component operating over a period of time, or in any other type of component susceptible to creep. Methods of optically measuring creep strain of a GTE component over a period of time using the system described above will now be explained.

Figure 5:
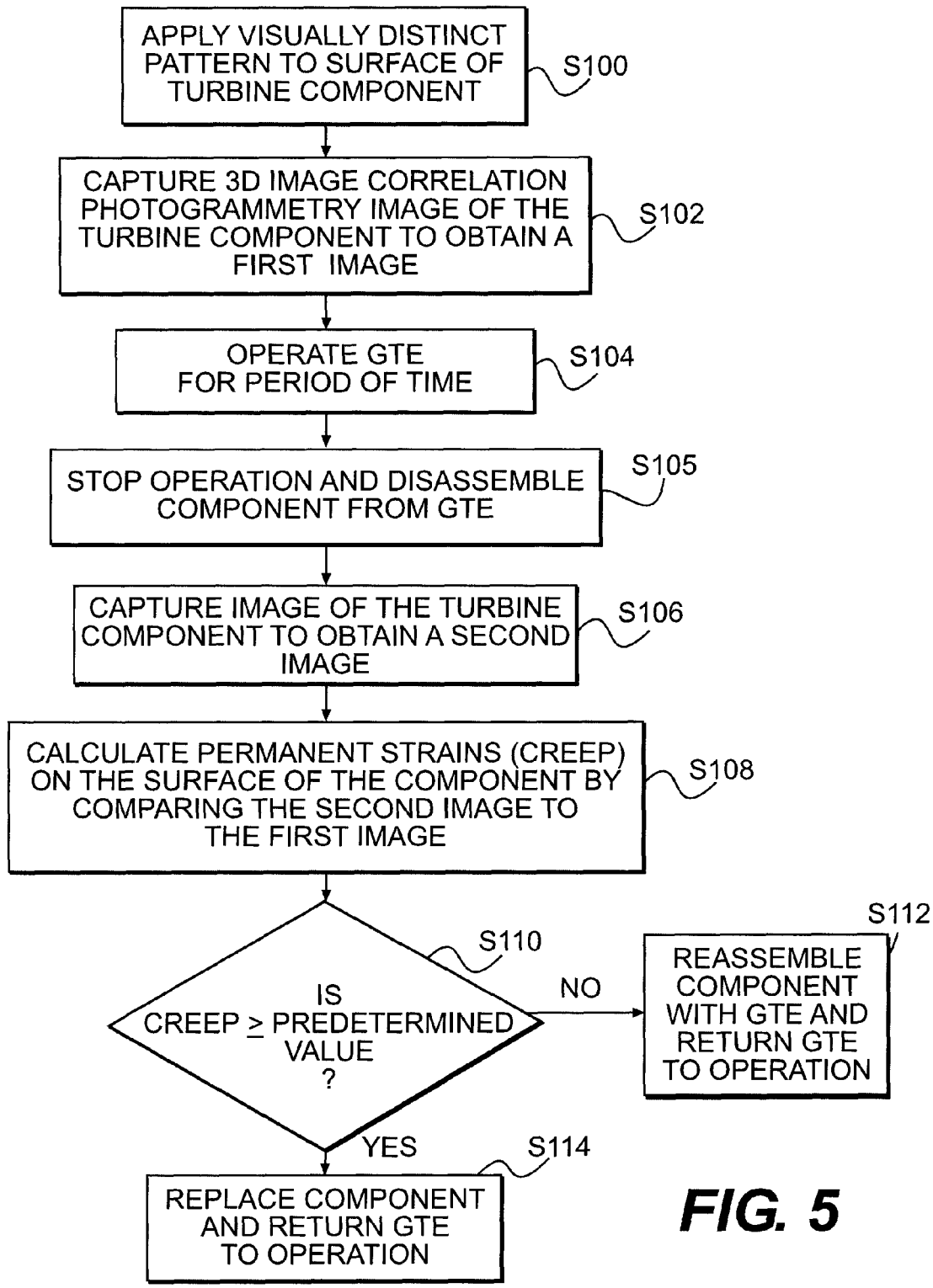
FIG. 5 is a flow chart of exemplary steps to measure creep strain in a GTE component.

With reference to FIG. 5, a method of measuring localized creep of a GTE component over a period of time is described. In step S100, a material is applied to a surface of a GTE component in a visually distinct pattern of markings. As described above, in some embodiments the material may be a ceramic, for example YSZ, and/or the material may be applied to a surface of a portion of a GTE component such as a turbine blade via plasma spraying. The phrase "visually distinct pattern of markings" as used herein includes non-continuous markings, of constant and/or varying shape and size so as to form a contrast with an underlying surface of the component.

In a step S102, a pair of digital cameras of the 3D image correlation photogrammetry system 87 are used to capture 3D image correlation photogrammetry images of the portion of the component having the material 84 disposed thereon (the "treated portion") before the component is put into operation or returned to operation. The pair of cameras 88 are arranged so that they focus on the treated portion of the component. The cameras 88 may capture an image of the treated portion, or the cameras 88 may capture a plurality or a set of images of the treated portion.

In a step S104, the component of the GTE is placed into operation for a period of time, which, as noted above, corresponds to an operational period. In some embodiments, the operational period may correspond to the time after a test of the GTE is conducted, or the time to a first specified overhaul inspection, or the time between overhaul inspections. For instance, the operational period may be at least 1,000 hours of operation time. In other embodiments, the operational period may be at least 10,000 hours, or correspond to a period of time between a regular overhaul inspection, which may be at 30,000, 60,000, or 90,000 hours of operation time. In yet other embodiments, the operational period may correspond to over 100,000 hours. Operating the GTE for a substantial period of time may allow for more accurate creep measurements by determining how actual creep may be progressing in a creep-limited component of the GTE, as compared to estimating creep based on much shorter operational periods.

After the operational period, in a step S105 the GTE component may be removed from operation and disassembled from the GTE. In step S106, the 3D image correlation photogrammetry system re-images the same treated portion of the component that was first imaged. The cameras 88 may capture one image when re-imaging the treated portion of the component, or the cameras 88 may capture a plurality or a set of images when re-imaging the treated portion. Then, in a step S108, the 3D image correlation photogrammetry system 87, specifically the controller 90, may compare the two sets of images, i.e. the images acquired at step S102 and the images acquired at step S106. The 3D image correlation photogrammetry system 87 may recognize similar surface patterns in the two sets of images, and divide the surface patterns into facets. Using conventional algorithms, the system 87 may then determine how the dimensions of each facet have changed between the two sets of images in order to obtain creep strain information over the treated portion of the component. Specifically, the 3D image correlation photogrammetry system 87 may measure how various markings of the material move with respect to one another and with respect to the same markings of the previous image after a period of operating time has passed. The relative movement between two markings, such as dots, provides data as to actual localized creep strain of a GTE component. For example, 3D photogrammetry system 87 may measure creep strain in a component to a 0.02% accuracy with resolutions of less than 1 mm. In some embodiments, the imaging steps 102 and 106 are performed under identical control conditions, for example loading, restraint, and temperature, in order to minimize mechanical and thermal strains unrelated to real creep strains.

Although in one embodiment the turbine blade 72 is removed from the GTE before being imaged, the turbine blade 72 may be photographed in situ after stopping the GTE and allowing for sufficient time for the GTE to cool. Imaging a GTE component such as a turbine blade in this manner may be more efficient by reducing shut-down time and labor required to remove the turbine blade from the turbine section of a GTE. Thus, step S105 may be optional, such that in some embodiments the GTE component may remain in place for reimaging in a step S106, and the GTE may be returned to service without disassembling the component from the GTE. Thus, in some embodiments the method of measuring creep may proceed from step S104 to step S106 without performing step S105.

In some embodiments, the method of optically measuring creep strain of a GTE component over a period of time optionally includes a step S110 of determining whether the measured creep is greater than or equal to a predetermined value, which may be expressed as a percentage. This predetermined value may, for example, correspond to a creep rupture reference value. If the measured creep strain is not greater than or equal to the predetermined value, according to step S112 the component may be returned to service in the GTE because it may be presumed that the component is not in danger of creep failure. If, however, the measured creep strain is greater than or equal to the predetermined value, according to step S114 the component may not be returned to service and replaced because the component may be close to creep failure.

Other criteria based on creep may also be used to determine when to retire a component. For example, a creep rate, which is the percent of creep per hour, often increases sharply before creep failure of a component. If several measurements are taken over time, a sharp or significant increase in creep rate may also be cause for removing a component from service. For example, step S110 may be replaced or supplemented with a step of determining whether the creep rate is greater than a predetermined value expressed as a percent per hour. Additionally or alternatively, an initial creep rate may be determined and compared to a measured creep rate in order to determine whether the component should be taken out of service. For example, step S110 may be replaced or supplemented with a step of determining whether the creep rate has exceeded an initial creep rate by a certain predetermined percentage per hour.

The disclosed methods allow for non-destructive, accurate optical measurement of permanent strains, including real localized creep, for a component that has operated in service for a period of time. While a material applied in a visually distinct pattern to a component allows for measurement of creep and gathering of creep strain information, the material may also possess thermal properties which provide a thermal barrier for a component subject to high temperatures. With such a system, long term measurements of creep strains can be made more accurately because real values can be obtained before and after the GTE component has operated for a period of time, making it unnecessary to extrapolate test data for predictions. Moreover, as noted above, the disclosed methods do not require destruction of a component, for example, to test samples of material or to quantify rafting, in order to measure localized creep strains. Thus, a component may be returned to service after measuring creep, and a component is not unnecessarily removed from service, thus reducing operating costs. Additionally, the disclosed methods provide accurate monitoring of component life at overhaul, which could extend overhaul periods and/or allow for components to be reused. According to the disclosed system, one or more used GTE components can be inspected to determine the amount of creep strain accumulated and whether the components can be returned to service and reused, or if the components are on the verge of failure and therefore must be retired in order to prevent possible damage to life and/or property. Additionally, measurements of creep acquired from the one or more inspected GTE components, for example a turbine blade, may provide a representative sample of creep for another GTE component, for example another turbine blade in the turbine section of the GTE. The described system and methods may be used to provide accurate evaluations of a particular GTE component's remaining life, for example at an overhaul inspection. The methods of the present disclosure also allow for the validation of analytical models of creep prediction by accurately comparing creep predictions with actual measured levels of creep.

As described above, the system and methods are applicable to any GTE component subject to creep. While turbine blades are one example of GTE components subject to creep, turbine nozzles, combustion liners, and heat exchangers are additional examples of creep limited GTE components. Additionally, the system and methods described above may be applicable to other part made of materials subject to creep, such as plastics and concrete. Long term creep monitoring could also be applied in other industries which utilize equipment subject to creep such as aerospace, nuclear, and petrochemical industries.

It will be apparent to those skilled in the art that various modifications and variations can be made to the disclosed system and method of measuring localized creep strain over periods of time. Other embodiments will be apparent to those skilled in the art from consideration of the specification and practice of the disclosed system and method. It is intended that the specification and examples be considered as exemplary only, with a true scope being indicated by the following claims and their equivalents.

What is claimed is:

1. A method of measuring creep strain in a gas turbine engine component, the method comprising:
    applying a ceramic material providing a plurality of markings arranged in a visually distinct pattern to at least a portion of the component before the gas turbine engine operates;
    capturing an image of at least a portion of the markings after an operation period of the gas turbine engine; and
    determining creep strain information of the component by correlating the image captured after the operational period to an image captured before the operational period.

2. The method of claim 1, wherein determining creep strain information includes determining a change in distance between at least two markings of the pattern of markings, the change in distance being determined from the image captured before the operational period and the image captured after the operational period.

3. The method of claim 1, wherein capturing the image of the markings after the operational period is performed under similar loading and temperature conditions to the capture of the image before the operational period.

4. The method of claim 1, further comprising removing the component from the gas turbine engine before capturing the image of the markings after the operational period.

5. The method of claim 1, wherein determining creep strain information includes determining a creep strain value, and the method further includes replacing the component if the determined creep strain value is greater than a predetermined creep strain value.

6. The method of claim 1, wherein the material is a thermally sprayed coating of ceramic.

7. The method of claim 6, wherein the ceramic is yttria-stabilized zirconia.

8. The method of claim 1, wherein the portion of the component having a material disposed thereon is an entire surface of a part of the component, and wherein the image captured after the operational period is of only a segment of the entire surface.

9. The method of claim 1, further comprising using a 3D image correlation photogrammetry system to capture the images after the operational period.

10. The method of claim 1, wherein the operational period is at least 1,000 hours.

11. A method of measuring creep strain in a gas turbine engine component, comprising:
    applying a ceramic material in a visually distinct pattern of markings to at least a portion of the component before the gas turbine engine operates;
    capturing a first image using a 3D image correlation photogrammetry system;
    placing the component into operation for an operational period of time;
    capturing a second image using the 3D image correlation photogrammetry system after the operational period of time has lapsed; and
    correlating the first image to the second image through a 3D image correlation photogrammetry system to determine actual creep strain information of the component.

12. The method of claim 11, wherein the material is applied using a plasma spraying process.

13. The method of claim 11, wherein the operational period of time for operating the component is at least 1,000 hours.

14. The method of claim 11, further comprising replacing the component if the determined creep strain information indicates that creep strain is greater than a predetermined creep strain value.

15. The method of claim 11, wherein the component is a turbine blade.

16. The method of claim 11, wherein the material is applied to an entire surface of a part of the component, and wherein the second image is of only a segment of the entire surface.

17. A system for measuring creep strain in a component of a gas turbine engine, comprising:
- a gas turbine engine component;
- a ceramic material providing a visually distinct pattern of markings disposed on at least a portion of the gas turbine engine component before the gas turbine engine operates; and
- a 3D image correlation photogrammetry system configured to acquire and compare images of the markings to determine creep strain information after an operational period of the gas turbine engine.

18. The system of claim 17, wherein the material includes a ceramic coating.

19. The system of claim 18, wherein the component includes a turbine blade of a first stage of a turbine section of the gas turbine engine.

20. The system of claim 17, wherein the material is disposed on an entire surface of a part of the component, and wherein the 3D image correlation photogrammetry system is configured to acquire and compare images of a segment of the entire surface, the segment being smaller than the entire surface of the part of the component.

* * * * *